(12) United States Patent
Keys et al.

(10) Patent No.: US 6,695,211 B2
(45) Date of Patent: *Feb. 24, 2004

(54) METHODS AND APPARATUS FOR ENHANCED SCANNER OPERATION EMPLOYING BAR CODE AND BAR CODE FRAGMENT TIME AND POSITION OF DATA COLLECTION

(75) Inventors: John B. Keys, Duluth, GA (US); Denis M. Blanford, Duluth, GA (US); Kenneth J. Fabian, Grayson, GA (US); Barry M. Mergenthaler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 91 days.

This patent is subject to a terminal disclaimer.

(21) Appl. No.: 10/120,916

(22) Filed: Apr. 11, 2002

(65) Prior Publication Data

US 2002/0117548 A1 Aug. 29, 2002

Related U.S. Application Data

(63) Continuation of application No. 09/001,369, filed on Dec. 31, 1997, now Pat. No. 6,394,351.

(51) Int. Cl.[7] .......................... G02B 26/10; G06K 7/10; G06K 9/22; G06K 19/06
(52) U.S. Cl. .............................. 235/462.25; 235/462.08
(58) Field of Search ............................. 235/454, 462.01, 235/462.08, 462.12, 462.16, 462.18, 462.25, 462.38, 462.36, 462.45, 472.01, 462.09; 250/235

(56) References Cited

U.S. PATENT DOCUMENTS

| | | | | |
|---|---|---|---|---|
| 4,409,469 A | * | 10/1983 | Yasuda et al. | 235/462.12 |
| 4,800,256 A | | 1/1989 | Broockman et al. | |
| 5,004,916 A | * | 4/1991 | Collins, Jr. | 250/235 |
| 5,013,899 A | * | 5/1991 | Collins, Jr. | 235/462.38 |
| 5,278,397 A | | 1/1994 | Barkan et al. | |
| 5,332,892 A | | 7/1994 | Li et al. | |
| 5,357,094 A | | 10/1994 | Baldwin | |
| 5,365,048 A | * | 11/1994 | Komiya et al. | 235/462.08 |
| 5,404,002 A | | 4/1995 | Tang | |
| 5,484,995 A | | 1/1996 | Scofield et al. | |
| 5,506,392 A | | 4/1996 | Barkan | |
| 5,510,605 A | | 4/1996 | Miyazaki | |
| 5,552,592 A | | 9/1996 | Dvorkis et al. | |
| 5,633,488 A | | 5/1997 | Spitz | |
| 5,663,552 A | * | 9/1997 | Komizo | 235/472.01 |
| 5,742,042 A | * | 4/1998 | Scofield | 235/462.36 |
| 5,898,163 A | * | 4/1999 | Sato et al. | 235/472.01 |
| 6,032,865 A | * | 3/2000 | Itoh et al. | 235/462.25 |
| 6,123,262 A | * | 9/2000 | Shellhammer | 235/462.25 X |
| 6,216,953 B1 | * | 4/2001 | Kumagai et al. | 235/472.01 |
| 6,394,351 B1 | * | 5/2002 | Keys et al. | 235/462.01 |
| 6,557,763 B2 | * | 5/2003 | Kato et al. | 235/454 |
| 6,581,832 B1 | * | 6/2003 | Kato et al. | 235/454 |

FOREIGN PATENT DOCUMENTS

| | | | |
|---|---|---|---|
| GB | 2 310 066 | | 8/1997 |
| JP | 5-12480 A | * | 1/1993 |
| JP | 7-141458 A | * | 6/1995 |
| JP | 7-282177 A | * | 10/1995 |

\* cited by examiner

*Primary Examiner*—Jared J. Fureman
(74) *Attorney, Agent, or Firm*—Priest & Goldstein, PLLC

(57) ABSTRACT

A timing and mirror position detector for use in a bar code scanner having a rotating optical assembly. The optical assembly is rotated by a motor which produces a fixed number of pulses per rotation, at least one of the pulses occurring each time the motor passes through a reference position as it rotates. The pulses are continuously monitored and counted. Elapsed time from the time a reference pulse occurs is accurately measured and correlated by a processor with events of interest. When an event of interest, such as a bar code scan, occurs, the timing and pulse count are evaluated and processed to determine the angle of rotation of the motor at the time the scan occurred.

20 Claims, 6 Drawing Sheets

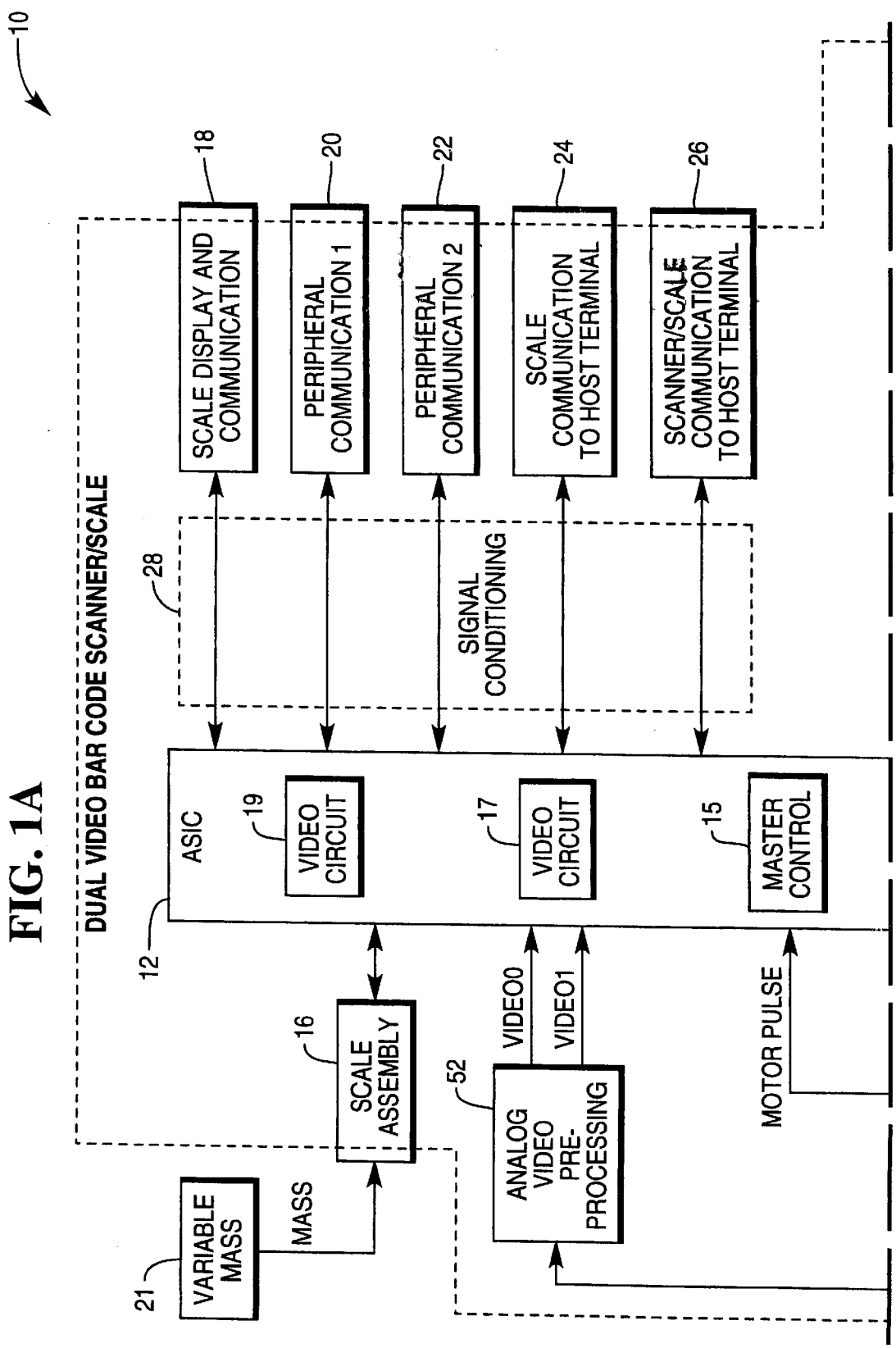

METHODS AND APPARATUS FOR ENHANCED SCANNER OPERATION EMPLOYING BAR CODE AND BAR CODE FRAGMENT TIME AND POSITION OF DATA COLLECTION

This application is a continuation of application Ser. No. 09/001,369 filed Dec. 31, 1997 now U.S. Pat. No. 6,394,351.

CROSS REFERENCE TO RELATED APPLICATIONS

The present application makes reference to U.S. Application Serial Nos. 09/001,367 and 09/001,368, entitled "Methods and Apparatus for Determining Bar Code Label Information", and "Methods and Apparatus for Dual Channel Video Recovery in Bar Code Scanners", respectively, filed on even date herewith and assigned to the assignee of the present invention. U.S. application Ser. No. 09/001,367 issued on Apr. 24, 2001 as U.S. Pat. No. 6,220,513. These applications are incorporated by reference herein in their entirety. As discussed in greater detail below, in a presently preferred embodiment of the present invention, the teachings of the present invention are used in conjunction with the teachings of the above referenced applications.

FIELD OF THE INVENTION

The present invention relates to bar code scanners. More particularly, the invention relates to methods and apparatus for collecting and recording time and mirror position information during bar code scans.

BACKGROUND OF THE INVENTION

Bar code scanners are presently used in numerous applications, and help to increase efficiency and accuracy wherever they are used. The use of bar code scanners in retail transactions decreases the time required to enter a transaction, and decreases the chance of an error during manual entry of data. Properly used, bar code scanners allow for increased efficiency in the use of labor, increased customer satisfaction due to reductions in waiting time and incorrect charges, and an improved quality of operation that comes from the reduction of pricing errors. Moreover, bar code scanning allows for instant, accurate updating of inventory, making for a greatly increased efficiency of operation.

Present-day bar code scanners are subject to fairly frequent failed scans. This requires that the item be rescanned, or that the item code be manually entered. This slows the scanning operation and impedes its efficiency.

In order to improve scanning efficiency and decrease the number of failed scans, modern-day high performance bar code scanners collect partial scans of bar codes as well as complete ones. When only partial scans or bar code fragments are available, an attempt is made to construct a valid bar code from them.

In bar code scanners of the present state of the art, only numerical information from the bar code itself is collected. In other words, present-day scanners are unable to gather information about the position of the bar code or the speed or timing of the scan. The information that is available for reconstruction of partial scans is therefore limited, reducing the number of successful bar code reconstructions from partial scans.

Bar code scanners typically include a laser beam directed by mirrors and/or lenses which is aimed at an area or volume being scanned. Light from the laser is collected from this area or volume and directed to a photodetector using a similar means. The signal from the photodetector is analyzed by a computing device which attempts to produce valid bar codes from the incoming signals. By way of example, at the supermarket checkout station, the checker passes each item to be purchased past a scanner such as the NCR 7875 model scanner.

It would greatly enhance the ability of the bar code scanner to capture information and reconstruct information from a partial scan, if the scanner could capture the time at which the bar code fragment was received, as well as the angle of the rotating mirror assembly at the time the data was collected. This would greatly increase the available information from which a complete bar code could be constructed. For example, probable location of the label could be recovered, as well as speed and direction of travel of the label, which would greatly improve the efficiency of the scanning process.

Moreover, numerous possibilities exist for ambiguity and confusion during the scanning of a bar code. For example, if two items come within the field of view of the scanner at the same time, it is not possible to scan them both. Rather, it is much more likely that the scanner will be unable to resolve the information from the two codes and the scan will fail. The addition of position and timing information would increase the likelihood that the two objects could both be distinguished and be successfully recognized.

There exists, therefore, a substantial need in the art for a bar code scanner which collects and stores timing and mirror angle or position information during a scan, for use in increasing the likelihood of success of the scan.

SUMMARY OF THE INVENTION

The present invention advantageously recognizes and addresses these and other needs as more fully described below. A bar code scanner according to one embodiment of the present invention includes a laser for producing light which is reflected from a bar code during a scan. The light is transmitted through an optical assembly including a rotating portion, or spinner, driven by a motor. The direction and location of incidence of the light depends on the angular position of the spinner. Associated with the motor is a Hall effect or other device for producing a pulse or pulses as the spinner rotates. A fixed number of pulses will occur for each rotation of the motor. The occurrence of each pulse correlates with a position of the motor. For example, two pulses may occur for each rotation. Thus, it is known that every other pulse the motor returns to a known reference position. A precise clock count can by synched off the pulse for the return to the reference position. From this time count and knowledge of the speed of rotation, a processor can readily determine the angular position of the motor at the time of an occurrence of interest, typically a scan or partial scan of a bar code.

By reconstructing in time and space the probable location of a bar code label at the time scanned, a large number of advantages may be achieved. For example, more than one bar code label can be read at the same time, whether or not the two labels are on the same item or two different items, and even if both have the same bar code data. The time and space data will allow discrimination between two items of the same kind scanned in rapid succession or even substantially simultaneously from a rapidly occurring double read of the same item.

Reconstruction of the location of a bar code label in space and time allows the determination of the speed and direction of the label as it is passed over the scanner. This allows the scanner to be programmed to give feedback to a cashier to assist in self-training to improve the efficiency of utilization of the scanner. The time and space data also makes it possible to capture improved first pass read metrics to allow a store manager to determine which cashiers are most efficient and which need further training.

Additionally, improved checkout security and checkout accuracy are provided. The probability of a false code being reconstructed out of partial reads of two different labels is significantly reduced. Labels which leave the scan zone and are returned can be recognized and ignored. For example, if an item is moved right to left across the scanner for a good read and is then moved left to right into the scan zone and then back to the left out of the scan zone, the second time the label is scanned can be safely ignored. Thus, the present approach can be used to prevent double reading in this and other circumstances. Further, the delay between reads of items can be reduced or eliminated.

Further, data received through multiple filtering circuits can be advantageously collected and correlated. Data received from certain angles or areas of the scan zone can be ignored if corresponding data is not detected in other portions of the scan zone to prevent misreads, such as belt reads. Filtering modes for certain areas of the scan zone can be selectively changed. Thus, by recording time and position data a host of substantial improvements can be achieved.

Additional features and advantages of the present invention will become apparent from the following detailed description and the accompanying drawings.

BRIEF DESCRIPTION OF THE DRAWINGS

FIGS. 1A and 1B illustrate a bar code scanner incorporating the use of captured time and mirror angle data according to the present invention;

DETAILED DESCRIPTION

Figure 1B:
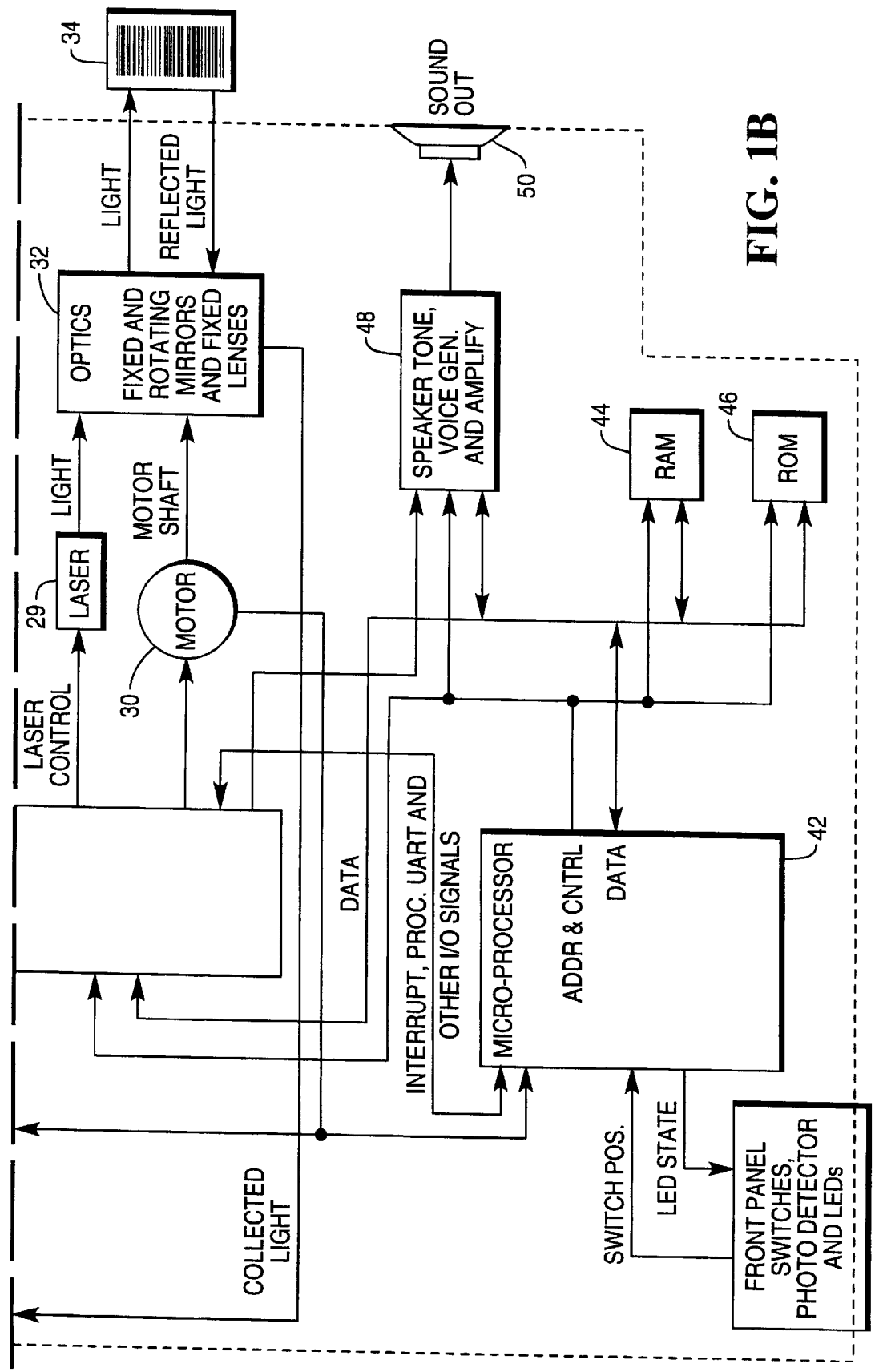

FIGS. 1A and 1B illustrate a bar code scanner 10 incorporating tense of captured time and mirror angle data according to the teachings of the present invention. The bar code scanner 10 preferably includes an application specific integrated circuit (ASIC) 12. ASIC 12 includes a master control circuit 15, a first video circuit 17 and a second video circuit 19, discussed in greater detail in connection with FIGS. 2A, 2B and 3 below. The illustrated bar code scanner 10 also preferably includes a scale assembly 16 on which an object such as variable mass 21 may be placed for weighing. For example, the variable mass 21 may be a bag of apples or other produce which is sold by the pound by a grocery store. The scale assembly 16 supplies weight information to the ASIC 12. In a presently preferred embodiment, the present invention will be utilized in conjunction with the teachings of U.S. application Ser. Nos. 09/001,367 and 09/001,368, entitled "Methods and Apparatus for Determining Bar Code Label Information", and "Methods and Apparatus for Dual Channel Video Recovery in Bar Code Scanners", in a scanner such as the NCR model 7875 scanner. U.S. application Ser. No. 09/001,367 issued on Apr. 24, 2001 as U.S. Pat. No. 6,220,513. It will be recognized, however, that the present invention may be utilized with a wide variety of scanners and without using the teachings of the related applications.

Bar code scanner 10 also preferably includes a scale display and communication circuit 18, a first peripheral communication circuit 20, a second peripheral communication circuit 22, a scale communication to host terminal circuit 24, and a scanner/scale communication to host terminal circuit 26, each of the circuits 18–26 furnishing signals to ASIC 12 with the signal from each of the circuits 18–26 first passing through a line conditioner 28. ASIC 12 also furnishes a laser control signal to a laser 29, and also furnishes commands to a motor 30. The motor 30 includes a motor shaft 30a to which is attached an optical assembly 32 which includes fixed mirrors which rotate as shaft 30a rotates. Additional fixed lenses and mirrors may be suitably employed to create the desired number and orientation of scan lines in a known manner. For example, while the present invention may be used with a host of existing scanners and scanners not yet designed, in a presently preferred embodiment, the invention may be suitably employed as an upgrade to the NCR model 7875 scanner.

As the motor 30 is driven in response to signals from the ASIC 12, optical assembly 32 is moved by motor 30. As light is emitted from laser 29, the light passes through optical assembly 32 to strike a bar code label 34 whenever a bar code label 34 is present within the scanner's field of view.

When light strikes bar code label 34, the light is reflected back to the optical assembly 32 and is collected by the optical assembly 32. An electrical signal is generated from the collected optical signal, and is passed to an analog video preprocessing circuit 52, which provides digital VIDEO0 and VIDEO1 signals to ASIC 12.

Bar code scanner 10 also includes a microprocessor 42. Interrupt, Processing, universal asynchronous receiver/transmitter (UART) and other input/output (I/O) signals are passed between the ASIC 12 and the microprocessor 42. Bar code scanner 10 further includes input/output package 40, which includes front panel switches, a photodetector and LEDS. The microprocessor 42 can accept settings from the front panel switches by receiving a switch position signal from the input/output package 40. The microprocessor sets the states of the LEDS on input/output package 40 by transmitting an LED state signal to the input/output package 40.

Bar code scanner 10 also preferably includes capabilities for sound generation, including sound output circuit 48 and speaker 50. For example, a beep may indicate a good bar code read. Other feedback may be provided such as training feedback based on time and position data. Bar code scanner 10 also includes RAM and ROM memory 44 and 46, respectively.

Bar code reader 10 produces tones and generated voice sounds in order to communicate with the operator. Sound output circuit 48 receives signals from ASIC 12 and microprocessor 42 for instructions on what sounds to generate and when to generate them. The sounds are passed to speaker 50. As noted above, a variety of new operator feedback can be provided based on the time and position data.

A data bus passes between ASIC 12, microprocessor 42, RAM memory 44, ROM memory 46 and sound output circuit 48. An address and control bus also passes between ASIC 12, microprocessor 42, RAM memory 44, and ROM memory 46.

The motor 30 drives the rotating portion of the optical assembly 32. The motor preferably includes a Hall effect device, which produces a fixed number of pulses each time the motor is rotated one revolution. It will be recognized that any sensor suitable to accurately sense motor position may be employed. The pulses are transmitted to the ASIC 12 and the microprocessor 42 in the form of a motor pulse signal. The ASIC 12 and the microprocessor 42 are able to correlate the motor pulse signals to a reference position of the motor. A count time derived from a source of fast clock pulses is generated, as the motor 30 turns at a known fixed rate, and the position can be calculated and correlated with events such as bar code scans or bar code intervals.

Thus, the motor pulse signal is used to synchronize a timer included in the processor 42 which indicates the angle of the motor 30 at a particular time. At a suitable time before the beginning of operation of bar code scanner 10, the processor 42 is programmed with information as to the number of pulses of a motor revolution and the pulse that is to be used as the reference for the beginning of the scan revolution. The ASIC 12 employs this information to synchronize the collection of event time to motor revolution, as will be described in further detail below.

Figure 2A:
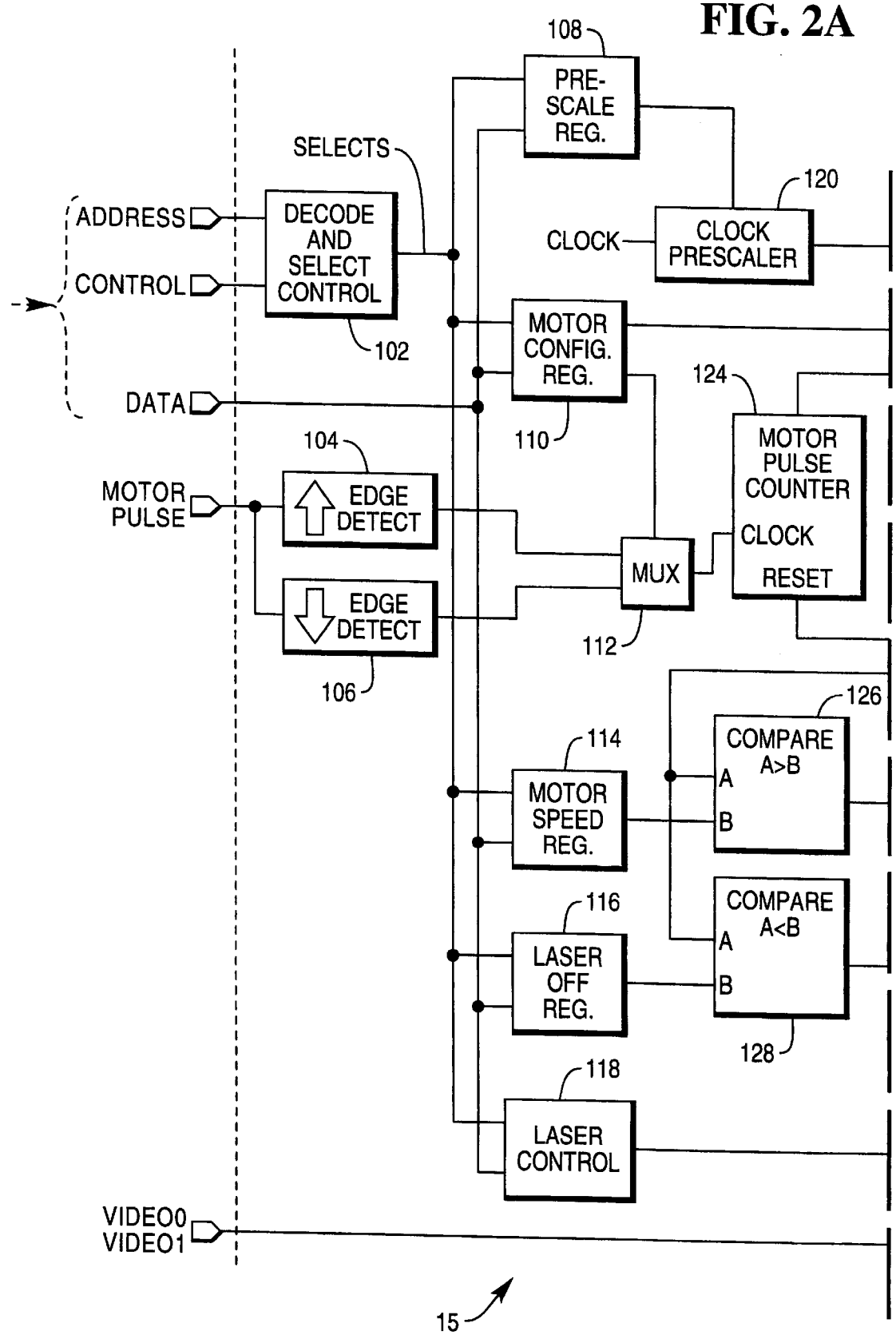
FIGS. 2A and 2B illustrate a control and data position acquisition circuit according to one aspect of the present invention for controlling a bar code scanner and obtaining timing and mirror angle data.
Figure 2B:
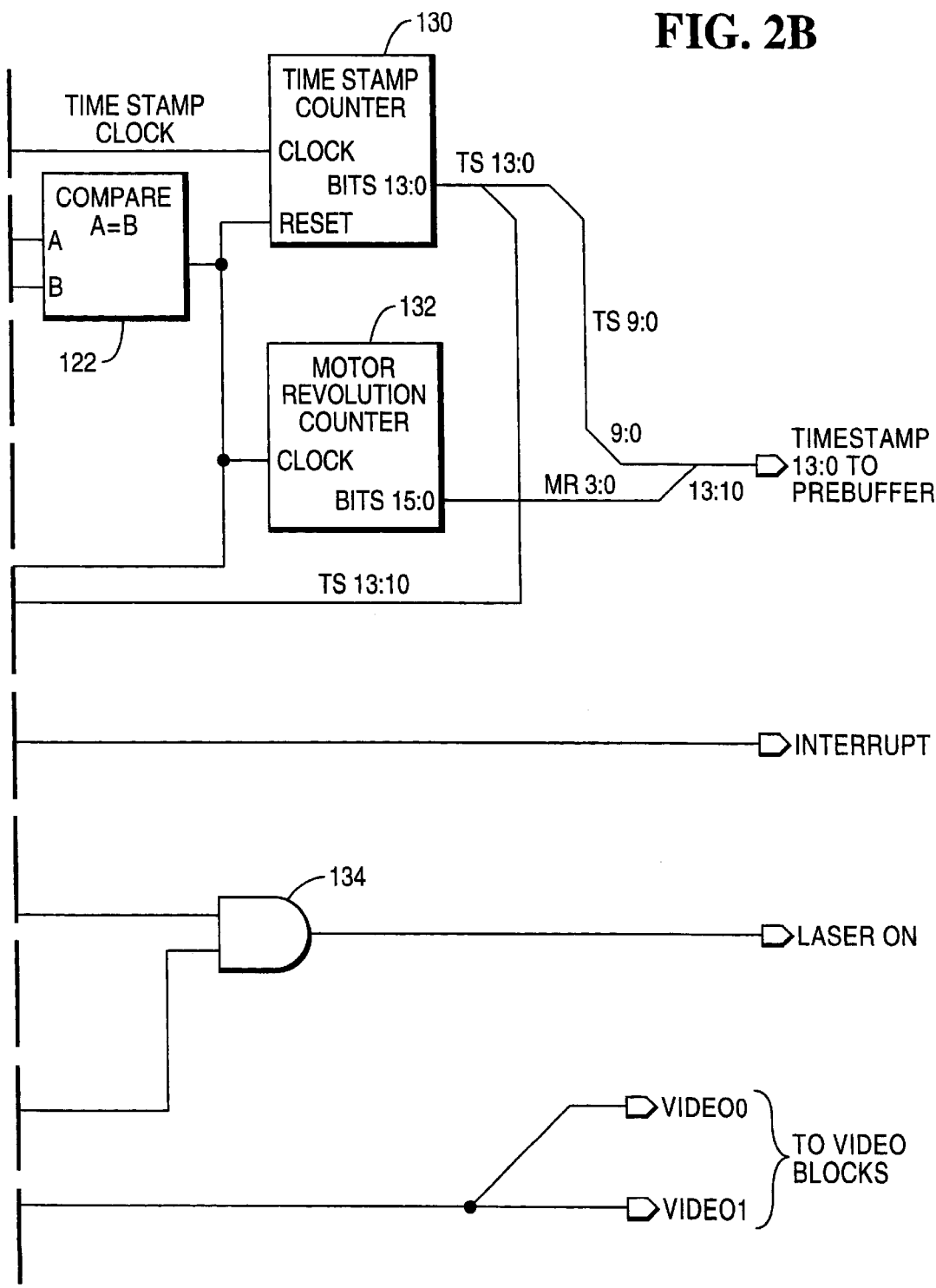

FIGS. 2A and 2B illustrate further details of master control circuit 15a, included in the ASIC 12. Master control 15 includes a decode and select control circuit 102, and leading edge detect and trailing edge detect circuits 104 and 106, respectively. Master control 15 also includes pre-scale register 108, motor configuration register 110, multiplexer 112, motor speed register 114, laser off register 116, and laser control 118, which are connected to decode and select control circuit 102, and also to data bus 43.

In typical operation of the ASIC 12, master control 15 receives address, control and data inputs from the microprocessor 42. The decode and select control circuit 102 selects one of pre-scale register 108, motor configuration register 110, motor speed register 114, laser off register 116 and laser control 118 in response to address and control signals from the microprocessor 42. Data is simultaneously placed on data bus 43 by microprocessor 42, and the data is loaded into the selected device.

Master control 15 also includes a time stamp clock 130 which generates a time stamp value which may up to 14 bits long. The time stamp clock 130 is controlled by a clock prescaler 120. The clock prescaler receives a constant clock input, and the rate at which the clock prescaler produces output is controlled by a value stored in the pre-scale register 102. The pre-scale value is set such that the maximum value for bits 0–9 is just greater than the time for a full revolution of motor 30 when it is turning at a predetermined minimum speed as discussed further below. The clock prescaler supplies a clock input to a time stamp counter 130, so that the clock of time stamp counter 130 is activated each time the clock prescaler increments. Time stamp counter 130 produces a signal TS, the overflow bits 10–13, which is supplied to the A input of a motor speed comparator 126. Motor speed comparator 126 is an A>B comparator, and receives as its B input, data from motor speed register 114 indicating a first predetermined minimum allowable speed of motor 30. When the motor rotates at less than the minimum allowed speed, the value TS exceeds the value stored in the motor speed register, and, therefore, the A input of comparator 126 exceeds its B input. Comparator 126 then produces an interrupt signal to the microprocessor 42 which can respond to this condition. This allows the microprocessor 42 to adjust the speed as desired to address special reading conditions, such as bar codes that are more easily read at slower than normal speeds of rotation.

Signal TS is also supplied as the A input of laser comparator 128, an A<B comparator, which also receives as its B input data from laser off register 116 indicating a second predetermined minimum, the minimum allowable speed for motor 30 at which the laser 29 will be allowed to operate. The output of laser comparator 128 is supplied to AND gate 134, which also receives an input from laser control 118. AND gate 134 provides a laser ON signal, controlling whether the laser 29 is on or off. Thus, the laser 29 can only operate when laser control 118 commands the laser 29 to be ON, and when the TS value indicates that the speed of motor 30 is within the allowed limits. When the speed of motor 30 is below the minimum allowed speed, the A input of laser comparator 128 exceeds the B input, the output of laser comparator 128 goes LOW, causing AND gate 134 to go LOW, and the laser on signal to likewise go LOW, causing laser 29 to be disabled.

The motor configuration register 110 stores data indicating the number of pulses per revolution and the polarity of the edge to synch on. The edge to synch on information is provided to multiplexer 112 which multiplexes the proper edge detect signal from detector 104 or 106 to time stamp counter 130. Pulse comparator 122 receives the number of pulses per revolution and supplies a reset input to clock motor pulse counter 124 and to time stamp counter 130, and a clock input to motor revolution counter 132.

As motor 30 rotates, a motor pulse signal is sent to ASIC 12, which receives it at leading and trailing edge detectors 104 and 106, respectively. Leading and trailing edge detectors 104 and 106 each produce an output which is supplied to multiplexer 112. Multiplexer 112 then supplies an output which is provided to a clock motor pulse counter 124. Clock motor pulse counter 124 counts the input received from multiplexer 112 and supplies the count to a pulse comparator 122. Pulse comparator 122, as noted above, also receives an input from motor configuration register 110, the input from motor configuration register 110 indicating the number of pulses in a full revolution. When the count produced by clock motor pulse counter 124 equals the value stored in motor configuration register 110, the pulse comparator 122 produces a pulse, which resets time stamp counter 130 and clock motor pulse counter 124, and increments the clock of motor revolution counter 132. Motor revolution counter 132 provides a count MR, which combines with the signal TS from clock time stamp counter to produce the Time Stamp count, which is used as further described below in connection with the discussion of FIG. 3.

Figure 3:
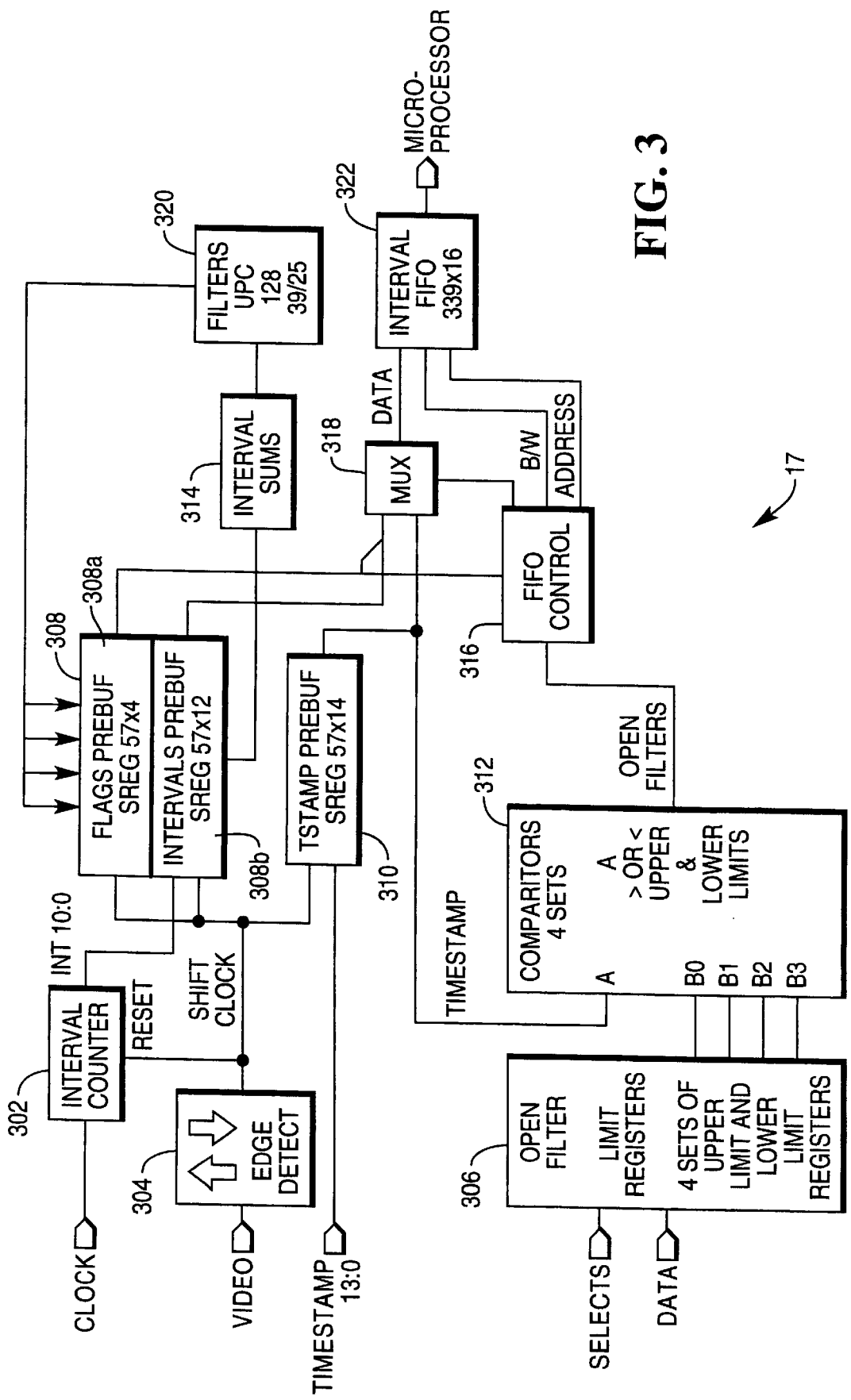
FIG. 3 is a diagram illustrating a video circuit used to obtain mirror angle data in a bar code scanner according to one aspect of the present invention.

FIG. 3 is a diagram illustrating the first video circuit 17 in further detail. First video circuit 17 is identical to and operates in parallel with second video circuit 19, which for the sake of simplicity will not be described in detail.

First video circuit 17 includes interval counter 302, edge detector 304, open filter limit register circuit 306 and prebuffer 308. The prebuffer 308 further includes flags prebuffer 308a and intervals prebuffer shift register 308b. First video circuit 17 further includes Tstamp prebuffer shift register 310, comparator circuit 312, interval sums circuit 314, FIFO control circuit 316, multiplexer 318, UPC filter 320 and Interval FIFO circuit 322.

The first video circuit 17 receives a video input, which is routed into edge detector 304. Edge detector 304 produces a shift clock output which is supplied to flags prebuffer shift register 308a and the Tstamp prebuffer shift register 310. The shift clock output is also supplied to the interval counter 302 as a reset input. Edge detector 304 causes interval counter 302 to be started on a video transition, a 12-bit signal INT which represents the value and the video polarity of the interval. The signal INT is shifted into the intervals prebuffer shift register on the next transition of the video signal, which also resets intervals counter 302, thus starting the timing of the next interval. These intervals represent the time interval or, effectively the width, of the bars and spaces making up a bar code being scanned.

At the same time, the Timestamp signal, which represents the 10-bit Time Stamp and the 4 least significant bits of the motor revolution counter 132 are shifted into the time stamp prebuffer shift register 310. Thus, the time duration of each video interval, the polarity and the time relationship to the motor position are captured for each video transition.

The video intervals are also sent through interval sum 314 and filter circuit 320, which determine if the video data stream meets predetermined timing relationships to indicate that the video data stream represents valid bar code data. Further details of presently preferred video processing are provided in U.S. Pat. No. 5,262,625 assigned to the assignee of the present invention and incorporated by reference herein in its entirety. For example, if the time interval between the beginning and end of the video data is too long, the data did not come from a valid scan of a bar code, and will be rejected. The beginning and end of legitimate bar code data are marked by setting flag bits in the flags prebuffer shift register 308a. The flag bits are then added to the corresponding interval data word stored in intervals prebuffer shift register 308b. The flags are used by the FIFO control 316 to determine which intervals are to be written into the interval FIFO 322, which buffers the interval data for microprocessor 42. When a beginning of block interval is written into interval FIFO 322, the corresponding Time Stamp value is also written into interval FIFO 322 preceding the interval data word. This is done by passing the Time Stamp signal from the Tstamp prebuffer shift register 310 and the output of prebuffer 308 into multiplexer 318 which operates under control of FIFO control 316 to control whether the Time Stamp or interval data is selectively written into comparator 312. The Time Stamp value is also sent to comparator circuit 312, where the signal is compared with the contents of the registers in open filter limit register circuit 306.

Open filter limit register circuit 306 includes four sets of open filter limit registers in which microprocessor 42 may load time values for comparison with the time stamp values received from the time stamp prebuffer. Microprocessor 42, in analyzing the interval data read from interval FIFO 322, may determine that more intervals than are being allowed by digital filter set 320, are required to properly decode the bar code data. This effectively allows real time control of the filter registers matched to observed scan conditions.

Microprocessor 42 then computes the time values for adjacent laser scan beams, and loads these limits in one or more of the open filter limit registers in open filter limit register circuit 306. The contents of the registers in open filter limit register 306 are fed to comparator circuit 312, for comparison to the Timestamp signal. When the Timestamp signal is within the time limits received from the open filter limit register circuit 306, comparator circuit 312 sends an open filters signal to FIFO control 316, causing FIFO control 316 to allow all the following intervals to be written into the internal FIFO 322 so long as this open filters signal is being provided. This signal will override starting or ending flag condition signals from the flags prebuffer 308a.

As shown in FIG. 2, ASIC 12 also includes the second video block 19, which operates in parallel with the first video block 17. The video blocks 17 and 19 may advantageously be supplied with signal VIDEO0 and VIDEO1 processed with different filtering and thresholding in analog video preprocessor 52. The received video signals are thus captured with differently conditioned analog circuitry. Proper choice of the filtering used and the processing employed in first video block 17 and second video block 19 gives a wider coverage to the laser signal reflected from the bar code 34.

Figure 4:
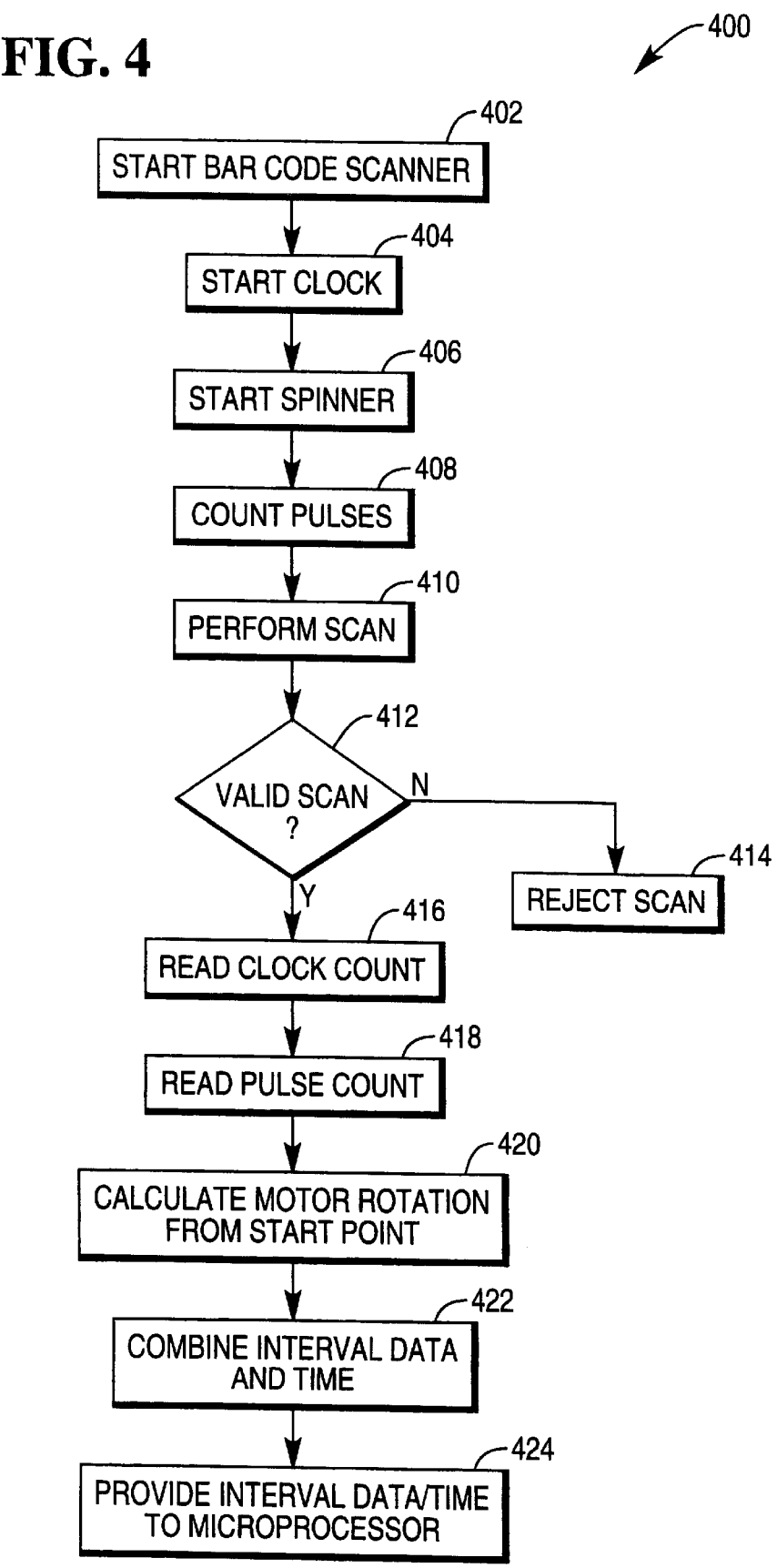
FIG. 4 is a flowchart illustrating a method of obtaining timing and mirror angle data according to one aspect of the present invention.

FIG. 4 is a flowchart illustrating a method 400 of detecting time and angular position of an optical assembly used in a bar code scanner according to the principles of the present invention. At step 402, the bar code scanner is started. The bar code scanner preferably includes an optical assembly having a rotating portion. This rotating portion of the optical assembly is preferably driven by a motor having an associated pulse producing device. At step 404, the motor is started. A pulse or pulses are produced by the pulse producing device associated with the motor. It will be recognized that any suitable position sensor may be employed. At step 406, a clock is started and the time is monitored. At step 408, clock pulses are counted and a time stamp is generated. Step 408 continues on an ongoing basis. That is, the clock pulses continue to be counted to generate a time stamp so long as the bar code scanner is operating or until the time stamp is reset to zero.

At step 410, a scan of a bar code is performed. At step 412, the scan is checked for validity. If the scan is invalid, control is passed to step 414 and the scan is rejected. If the scan is valid, control is passed to step 416 and the time stamp is checked to determine the time of the scan. The time data is then stored. At step 418, the pulse count is recovered from the pulse counter and stored. At step 420, the total angular rotation of the motor from its starting point, corresponding to the synch pulse, that has occurred during the time measured by the time stamp is calculated. At step 422, the time and the associated interval data for an event of interest are combined to produce a combined information block. At step 424, the combined information block is supplied to a microprocessor, and is then used by the microprocessor to improve the accuracy of the scan by reconstructing a bar code from appropriate bar code fragments with timing and position data indicative that they come from the same bar code, or by discriminating between two bar codes read within a shorter than normally acceptable interval. Alternatively, the timing and position data can be utilized to provide operator feedback or to achieve other advantages previously discussed above.

While the present invention has been disclosed in the context of a presently preferred embodiment, it will be recognized that the present invention will have widespread applicability to bar code scanners generally making possible a wide range of improvements in operation not presently available.

We claim:

1. A method of bar code processing comprising the steps of:

scanning at least a first portion of at least one bar code by rotating a portion of an optical assembly to generate a scanned bar code signal;

processing the scanned bar code signal to produce a plurality of video intervals, each video interval representing the width of a bar or a space of the scanned bar code scanned, each video interval including a starting video transition; and determining an angular position of the rotating portion of the optical assembly at each starting video transition.

2. The method of claim 1 further comprising the step of:

determining the width of each of the video intervals, each width represented as a time duration of the corresponding video interval.

3. The method of claim 1 wherein the rotating portion comprises a mirror assembly which is rotated by a motor, and wherein the step of determining an angular position comprises the substep of:

determining an elapsed time since the motor rotated through a reference position.

4. The method of claim 3 further comprising the step of:

producing a pulse by a pulse generator each time the motor rotates through the reference position.

5. The method of claim 1 further comprising the step of:

determining an approximate position of said first portion of at least one bar code.

6. The method of claim 5 further comprising the step of:

utilizing the approximate position to aid in decoding the bar code.

7. The method of claim 1 further comprising the step of:

determining a time at which the scan occurred.

8. The method of claim 7 wherein the step of determining a time comprises the substep of:

determining a time at which each starting video transition occurred.

9. The method of claim 7 further comprising the step of:

utilizing the angular position and the time of the scan to reconstruct a complete bar code from said first portion and a second portion of the at least one bar code scanned at a later time.

10. A method of bar code processing comprising the steps of:

scanning at least a first portion of at least one bar code by rotating a portion of an optical assembly to generate a scanned bar code signal;

processing the scanned bar code signal to produce a plurality of video intervals, each video interval including a starting video transition;

determining an angular position of the rotating portion of the optical assembly at each starting video transition;

determining a time at which the scan occurred; and utilizing the angular position and the time of the scan to discriminate between a double read of a single bar code and reads of two separate bar codes occurring closely spaced in time.

11. A bar code processing system comprising:

an optical assembly including a rotating portion for scanning at least a first portion of at least one bar code;

a motor rotating the rotating portion of the optical assembly; and a processing apparatus which processes the scanned bar code to produce a plurality of video intervals, and determines an angular position of the rotating portion of the optical assembly at a starting video transition for each video interval, each video interval representing the width of a bar or space of the scanned bar code.

12. The processing system of claim 11 wherein the processing apparatus determines an elapsed time since the motor rotated through a reference position.

13. The processing system of claim 12 further comprising:

a pulse generator which produces a pulse each time the motor rotates through the reference position.

14. The processing system of claim 11 wherein the processing apparatus determines an approximate position of said first portion of at least one bar code.

15. The processing system of claim 14 wherein the processing apparatus utilizes the approximate position to aid in decoding the bar code.

16. The processing system of claim 11 wherein the processing apparatus determines a time at which the scan occurred.

17. The processing system of claim 16 wherein the processing apparatus utilizes the angular position and the time of the scan to reconstruct a complete bar code from said first portion and a second portion of the at least one bar code.

18. The processing system of claim 11 wherein the processing apparatus determines a time each starting video transition occurred.

19. A bar code processing system comprising:

an optical assembly including a rotating portion for scanning at least a first portion of at least one bar code;

a motor rotating the rotating portion of the optical assembly; and a processing apparatus which processes the scanned bar code to produce a plurality of video intervals, and determines an angular position of the rotating portion of the optical assembly at a starting video transition for each video interval;

wherein the processing apparatus determines a time at which the scan occurred;

wherein the processing apparatus utilizes the angular position and the time of the scan to discriminate between a double read of a singe bar code and reads of two separate bar codes occurring closely spaced in time.

20. A bar code processing system comprising:

means for scanning at least a portion of at least one bar code by a rotating portion an optical assembly;

means for processing the scanned bar code to produce a plurality of video intervals, each video interval representing the width of a bar or a space of the scanned bar code, each video interval including a starting video transition; and means for determining an angular position of the rotating portion of the optical assembly at each starting video transition.

* * * * *

UNITED STATES PATENT AND TRADEMARK OFFICE
CERTIFICATE OF CORRECTION

PATENT NO. : 6,695,211 B2
DATED : February 24, 2004
INVENTOR(S) : Keys et al.

It is certified that error appears in the above-identified patent and that said Letters Patent is hereby corrected as shown below:

Column 9,
Line 2, after "code" delete "scanned".

Column 10,
Line 43, delete "singe" and substitute -- single --.

Signed and Sealed this

Sixth Day of July, 2004

JON W. DUDAS
*Acting Director of the United States Patent and Trademark Office*